(12) United States Patent  (10) Patent No.: US 7,523,862 B2
Tracy et al.  (45) Date of Patent: Apr. 28, 2009

(54) MULTI-FUNCTION KEYPAD USING COLORED LIGHT SOURCES AND OPTICAL FILMS

(75) Inventors: James L. Tracy, Coral Springs, FL (US); Habib Amirzadeh, Weston, FL (US); David I. Blatt, Margate, FL (US); Julio C. Castaneda, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 217 days.

(21) Appl. No.: 11/419,041

(22) Filed: May 18, 2006

(65) Prior Publication Data

US 2007/0267497 A1  Nov. 22, 2007

(51) Int. Cl.
G06K 7/10 (2006.01)
(52) U.S. Cl. .................... 235/454; 235/145 R
(58) Field of Classification Search ................ 235/454, 235/145 R; 200/5 A, 311, 314, 341; 362/23
See application file for complete search history.

(56) References Cited

U.S. PATENT DOCUMENTS

| | | | |
|---|---|---|---|
| 4,636,593 A | | 1/1987 | Novak et al. |
| 5,107,082 A | | 4/1992 | Valenzona |
| 5,384,459 A | | 1/1995 | Patino et al. |
| 5,397,867 A | * | 3/1995 | Demeo ................ 200/5 A |
| 5,408,060 A | | 4/1995 | Muurinen |
| 5,557,055 A | | 9/1996 | Breitweiser, Jr. |
| 5,682,456 A | | 10/1997 | Ishiguchi et al. |
| 5,914,676 A | | 6/1999 | Akpa |
| 5,940,015 A | | 8/1999 | Thornton et al. |
| 6,259,044 B1 | | 7/2001 | Paratore et al. |
| 6,535,605 B1 | | 3/2003 | Ghassabian |
| 6,608,271 B2 | | 8/2003 | Duarte |
| 6,720,892 B1 | * | 4/2004 | Lachor ..................... 341/22 |
| 6,755,561 B2 | | 6/2004 | Kluser |
| 6,965,789 B2 | | 11/2005 | Hauge et al. |
| 7,005,596 B2 | * | 2/2006 | Maeda et al. ............. 200/314 |
| 2002/0163316 A1 | | 11/2002 | Lys et al. |
| 2003/0072595 A1 | * | 4/2003 | Al-Safar .................. 400/490 |

(Continued)

FOREIGN PATENT DOCUMENTS

WO  WO02054428 A1  7/2002

OTHER PUBLICATIONS

The Third Evolution, Programmable, RGB-backlit LCD Push-button Switches, Technical Datasheet, http://www.lcd-keys.com/downloads/SA_Technical_Datasheet_v1_1.pdf, accessed May 17, 2006.

(Continued)

*Primary Examiner*—Thien M Le

(57) ABSTRACT

A multi-function key system for use with an electronic device can include at least one key (230) and an optical film (255) optically coupled to the key. The optical film (255) can include a first optical filter (260) corresponding to a first color of light and a second optical filter (265) corresponding to a second color of light. The multi-function key system further can include a first light source (275), disposed below the key, that emits the first color of light and a second light source (280), disposed below the key, that emits the second color of light. A controller (215) can selectively activate the first light source (275) or second light source (280) responsive to an event detected within the electronic device.

20 Claims, 3 Drawing Sheets

U.S. PATENT DOCUMENTS

| | | |
|---|---|---|
| 2004/0120140 A1 | 6/2004 | Fye et al. |
| 2005/0079333 A1 | 4/2005 | Wheatley et al. |
| 2005/0116930 A1 | 6/2005 | Gates |
| 2005/0168966 A1* | 8/2005 | Maeda et al. ............ 362/23 |
| 2006/0037848 A1 | 2/2006 | Kobayashi |
| 2006/0187658 A1 | 8/2006 | Evans et al. |
| 2007/0114368 A1* | 5/2007 | Idzik et al. ............ 250/227.22 |
| 2007/0236907 A1 | 10/2007 | Latella et al. |

OTHER PUBLICATIONS

International Search Report, PCT (Patent Cooperation Treaty), International Application No. PCT/US 07/64979, International Filing Date: Mar. 27, 2007, Priority Date: May 18, 2006, 7 pages.

PCT (Patent Cooperation Treaty) International Search Report dated Feb. 21, 2008 relating to Application No. PCT/US07/60200 filed Jan. 8, 2007 - 7 Pages.

* cited by examiner

MULTI-FUNCTION KEYPAD USING COLORED LIGHT SOURCES AND OPTICAL FILMS

BACKGROUND OF THE INVENTION

1. Field of the Invention

The present invention generally relates to keys and keypads for use with an electronic device and, more particularly, to multi-function keys and keypads.

2. Background of the Invention

Electronic devices, and particularly mobile devices, are becoming increasingly complex. This increased complexity often is at odds with the need to maintain a small form factor, thereby placing a strain on the man-machine interface of the device. It is not uncommon for a mobile phone, for example, to include a camera, a digital media player, scheduling functionality, and the like. The number of available user-selectable options tends to increase with device complexity. At the same time, a mobile device must retain a relatively small form factor so that carrying the device is not unduly burdensome.

To maintain a small form factor, the number of keys provided on a device usually is limited. Multi-function keys are an enhancement to the man-machine interface that allows a user to access more than one function from a single key. More particularly, a multi-function key can refer to a key that, when activated, causes the electronic device to perform a particular function. When the electronic device is placed in a different operating state, that same key, when activated, can cause the electronic device to perform a different function. As a result, the user can access more functions than the number of keys provided on the device.

Conventional multi-function keys usually bear a label or symbol corresponding to each function assigned to that key. For example, one function assigned to the key may be written above the key while another function also assigned to the key is written below. The function descriptions tend to be static, i.e. the descriptions are usually inked or inscribed on the device housing proximate to the key. Accordingly, the user is able to view both key labels simultaneously. It is the user's responsibility to understand the workings of the device to know which key function, and corresponding label, is assigned to the key at any given time.

SUMMARY OF THE INVENTION

The present invention relates to multi-function keys and keypads for use with an electronic device, such as a mobile station. One arrangement of the present invention can include at least one key and an optical film that is optically coupled to the key. The optical film can include a first optical filter corresponding to a first color of light and a second optical filter corresponding to a second color of light. The multi-function key system further can include a first light source disposed below the key that emits the first color of light, a second light source disposed below the key that emits the second color of light, and a controller that selectively activates the first or second light source responsive to an event detected within the electronic device.

The first optical filter can include one or more first symbols, such that light from the first light source renders the first symbol visible. The second optical filter can include one or more second symbols, such light from the second light source renders the second symbol visible. The first symbol or the second symbol can be visible according to which light source is illuminated. The first symbol and the second symbol are not concurrently visible.

The multi-function key system also can include a protective film disposed over the key. In one arrangement, the protective layer can be substantially transparent. In another arrangement, the protective layer can be semi-opaque such that the first symbol and the second symbol are obscured from view when no light source is illuminated.

Another arrangement of the present invention can include a multi-function key system for use with an electronic device including one or more keys, a first optical film having at least a first symbol in a first color, wherein the first optical film is otherwise transparent and is optically coupled to the key. The system can include a second optical film having at least a second symbol in a second color, wherein the second optical film is otherwise transparent and is optically coupled to the key. The multi-function key system further can include a first light source disposed below the key that emits light in the first color and a second light source disposed below the key that emits light in the second color. A controller can selectively activate the first or second light source responsive to an event detected within the electronic device.

The multi-function key system can be configured such that when the first light source is illuminated, the second symbol can be visible. Similarly, when the second light source is illuminated, the first symbol can be visible. The first symbol or the second symbol can be visible according to the light source that is illuminated. The first symbol and the second symbol are not concurrently visible when one of the light sources is illuminated.

Yet another arrangement of the present invention can include a multi-function key system for use with an electronic device including at least one key having a first optical filter corresponding to a first color of light and a second optical filter corresponding to a second color of light. The multi-function key system can include a first light source, disposed below the key, that emits light of the first color and a second light source, disposed below the key, that emits light of the second color. A controller can be included that selectively activates the first light source or the second light source responsive to an event detected within the electronic device thereby illuminating the first optical filter or the second optical filter.

In one arrangement, the first optical filter can include at least a first opaque symbol. The second optical filter can include at least a second opaque symbol. The first symbol or the second symbol can be highlighted by an illuminated background according to the light source that is illuminated. The first symbol and the second symbol may not be concurrently viewed against an illuminated background when one of the light sources is illuminated.

In another arrangement, the first optical filter can include at least a first opaque symbol. The second optical filter can include at least a second opaque symbol. The first opaque symbol or the second opaque symbol can become visible against an illuminated background according to the detected event.

The multi-function system further can include a protective layer disposed over the key. In one arrangement, the protective layer can be substantially transparent. In another arrangement, the protective layer can be semi-opaque to obscure the first symbol and second symbol from view when no light source is illuminated.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system for a multi-function key or keypad. The inventive arrangements disclosed herein can selectively display any of a plurality of different symbols in relation to a particular key, or keys, of a keypad for use with an electronic device. More particularly, one or more multi-function keys each can be associated with a plurality of different symbols. Each symbol can correspond to a particular function that can be assigned to the key. The particular symbol that is displayed, therefore, can indicate the particular function assigned to the key at any given time. Depending upon the particular operating state of the device, a different symbol can be displayed upon the key, thereby dynamically changing the symbol of the key according to the function assigned to the key.

Figure 1:
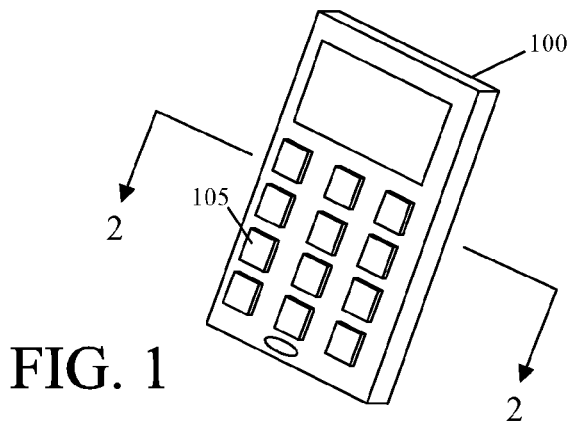
FIG. 1 depicts a mobile station having a multi-function keypad which is useful for understanding the present invention.

FIG. 1 depicts a mobile station 100 having a multi-function keypad which is useful for understanding the present invention. Accordingly, one or more of the keys, for example key 105, can be multi-function keys. As used herein, a multi-function key can refer to a key that, when activated, causes an electronic device, such as the mobile station 100, to perform a particular function. When the electronic device is placed in a different operating state, that same key, when activated, can cause the electronic device to perform a different function. As a result, the user can access more functions than the number of keys provided on the mobile station 100.

Figure 2:
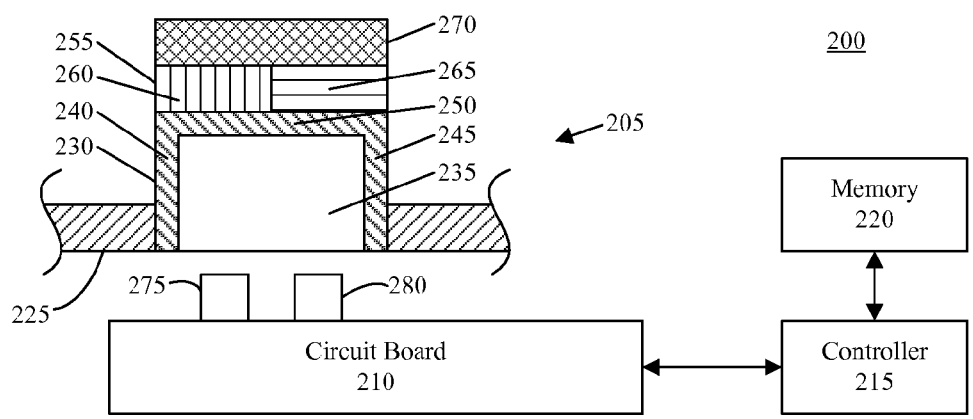
FIG. 2 depicts a section view of the mobile station of FIG. 1 taken along section line 2-2.

FIG. 2 depicts a section view of the mobile station of FIG. 1 taken along section line 2-2. More particularly, FIG. 2 illustrates a multi-function key system 200 which has been incorporated into the mobile station 100. As shown, the system 200 can include a keypad assembly 205, a circuit board 210, a controller 215, and a memory 220. The keypad assembly 205, which is shown in cross-section, includes a keypad base 225 and at least one key 230. The key 230 has a back portion 235, two side portions 240, 245, a top portion 250, and a front portion (not shown). The back portion 235, two side portions 240, 245, and front portion effectively join to form a perimeter wall that defines an internal cavity. Though shown as having a rectangular shape, it should be appreciated that key 230 can be elliptical or circular in shape. The particular shape of key 230 is not intended to be a limitation of the present invention.

The key 230 can be made of any suitable material that allows light to pass substantially unaltered. That is, the key 230 can be made of a substantially transparent or translucent material, i.e. light permeable, such that little, if any, filtering or scattering of light occurs. Substantially transparent or translucent, as used herein, can mean that the material allows a colored image and/or a plurality of different colors of light to be viewed through the material.

The mechanics of keypad assembly 205 have been omitted as any of a variety of different mechanical and/or electronic keypads can be used. In illustration, though FIG. 2 depicts the key 230 as being distinct from the keypad base 225, i.e. a mechanical key having a spring, in another arrangement, the key 230 and the keypad base 225 each can be fabricated from a common mold, i.e. using a silicone material having suitable physical properties relating to the passing of light and which further allows actuation of the key 230 when pressed by a user.

Disposed approximately parallel to the top 250 of key 230 is an optical film 255. The optical film 255 can include two filter portions referred to as filter 260 and filter 265. Each filter 260, 265 can correspond to a different color. For example, filter 260 can be a blue light filter and filter 265 can be a red light filter. In one arrangement, the optical film 255 can be implemented as one of the Photonics Filter Films as is available from 3M™ of St. Paul, Minn., though the present invention is not limited to the use of any one particular type of optical film. For example, in another arrangement two films can be placed side-by-side to achieve the multi-color filtering effect described herein.

As shown, the filters 260, 265 of the optical film 255 do not overlap or at least have portions that do not overlap. Each filter 260, 265 can include one or more symbols embedded or etched into the non-overlapping portions of the filters 260, 265. As used herein, a symbol can include a graphic, a letter, a number, a portion of text, or other indicia or visual marker that can be used to signify or indicate the function assigned to the key 230. In accordance with the multi-functional aspect of key 230, it should be appreciated that the symbol of filter 260 can be different, or visually distinct, from the symbol included in filter 265. In one arrangement, the distinction can be solely related to color, i.e. that filter 260 is blue and filter 265 is red. In another arrangement, however, the symbol of each filter 260, 265 can differ with respect to one or more characteristics, whether color, size, shape, or a different symbol, i.e. letter, etc.

Located on top of optical film 255 can be a protective layer 270. In one arrangement, protective layer 270 can be substantially translucent or transparent as described herein. In another arrangement, the protective layer 270 can be opaque or semi-opaque where the symbols disposed on filter 260 and/or filter 265 are hidden from view unless the light source corresponding to one or both of the filters, as the case may be, is illuminated. Protective layer 270 can serve as a guard layer or film over the optical film 255 to prevent scratching or other damage that may occur to the optical film 255 as a result of operation of the key 230 by a user. Optical film 255 can be optically coupled to the key 230. Protective layer 270 can be optically coupled to the key 230 through the optical film 255.

As used herein, the phrase "optically coupled" refers to two or more objects, i.e. optical films and/or keys, which are positioned such that a single source of light, i.e. light source 275 or 280, can be positioned to emit light that passes through each object said to be optically coupled in series fashion, i.e. one after the other. In one arrangement, optically coupled objects can lie in a same plane, i.e. be stacked such that each object is substantially parallel to each other optically coupled object. Optically coupled objects can be laminated together, layered, or secured by other means, i.e. at the edges without bonding, etc. The phrase "optically coupled" is not intended to suggest one particular way of physically joining objects, but rather to indicate the manner in which the objects are positioned relative to one another and a light source.

Below the keypad assembly 205 can be a circuit board 210 such as a printed circuit board (PCB). The circuit board 210 can include at least two light sources 275, 280. In one arrangement, each light source 275, 280 can be implemented as a light emitting diode (LED). Further, the color of each light source 275, 280 can correspond, or be matched, to the filters 260, 265. That is, light source 275 can be of a color that corresponds, or is similar, to filter 260 such that when illuminated, light from light source 275 can pass through filter 260, but be blocked, or at least substantially blocked, by filter 265. Similarly, light source 280 can be of a color that corresponds, or is similar, to filter 265 such that when illuminated, light from light source 280 can pass through filter 265, but be blocked, or at least substantially blocked, by filter 260. Accordingly, when light source 275 is illuminated, the symbol of filter 260 becomes visible on key 230. When light source 280 is illuminated, the symbol of filter 265 becomes visible on key 230.

Controller 215 can be a processor such as a microprocessor, a programmable logic device, or other circuitry, which is either located on circuit board 210 or another circuit board. In any case, controller 215 can be electrically coupled to circuit board 210 and light sources 260, 265, whether directly or through one or more buffer, amplifier, or other circuits. Similarly, memory 220 can be electrically coupled to controller 215 and also may be located on circuit board 210 or another circuit board.

In operation, controller 215 can execute a program, which may be stored within the controller 215 or memory 220. The controller 215 can monitor for particular events within the electronic device within which the multi-function key system 200 is disposed. An event, as used herein, can include, but is not limited to, receiving a message, whether voice, text, etc., receiving a user input, or any other occurrence that causes a change in operating state of the device. In one arrangement, where the electronic device is a mobile station, examples of events can include, a message or user input placing the mobile station in a text messaging mode where the keys are likely to be used to type alpha-numeric characters to compose a message. Another example can include a message or user input placing the mobile station in a voice communication mode where the keys are likely to be used to dial a telephone number.

Responsive to detecting particular events within the electronic device, the controller 215 can cause either light source 275 or light source 280 to be illuminated. The occurrence of a particular event can cause key 230 to have or perform one of a plurality of different functions, i.e. inputting a letter or inputting a number. Each function that can be assigned to the key 230 can be associated with one of the symbols in filters 260, 265 and, correspondingly, the light source that causes that symbol to be visible. Accordingly, activation of one of light sources 275 or 280 in response to the event causes the symbol of the filter 260 or 265 that corresponds, or is matched, to the illuminated light source to become visible on or within key 230.

The particular operating modes and events discussed above have been provided for purposes of illustration only and, as such, are not intended to limit the present invention in any way. Similarly, the particular colors noted herein in relation to filters 260, 265 and light sources 275, 280 have been used for purposes of illustration only. It should be appreciated that other colors of filters and light sources can be used so long as such colors are matched, as described, as a filter and light source pair. Further, more than two filters and light sources can be included and a given light source pair may service more than a single key depending upon the keypad configuration.

Though the optical film 255 was described as being located on top of key 230, it should be appreciated that, in another arrangement, optical film 255 can be located beneath the top portion 250 of button 230. In such an arrangement, the optical film 255 can be located above circuit board 210. The optical film(s) noted herein can be coupled or attached to the key 230 or keypad assembly 225 through insert molding, laminate adhesive heat rolling, laminate bonding heat press, or otherwise mounting the films between the light sources 275, 280 and key 230.

Figure 3:
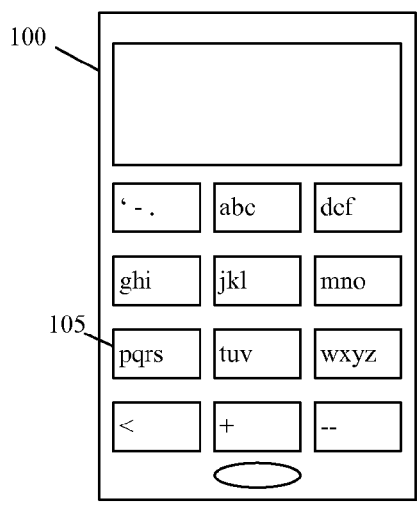
FIG. 3 depicts the mobile station of FIG. 1 in a particular operating state that is useful for understanding the present invention.

FIG. 3 depicts the mobile station 100 of FIG. 1 in a particular operating state that is useful for understanding the present invention. For purposes of illustration, it can be assumed that mobile station 100 has been placed into an operating state in which the keys of the device are likely to be used to type text, i.e. a text messaging mode. Accordingly, the symbol(s) that are visible for each key are alphabetic symbols rather than numeric symbols.

For example, with reference to FIG. 2, a red light source can be illuminated. The corresponding red light filter associated with each respective key of the mobile station 100 can include one or more alphabetic symbols as shown on the keys. The red light source emits light having a wavelength that is within a pass band of the red light filter. Accordingly, only red light from the red light passes through the filter. This results in only those symbols included in the red light filter being visible on the keys. For instance, key 105 displays visual symbols, or a legend, of "pqrs" which would be the symbols included on the red light filter for key 105.

Figure 4:
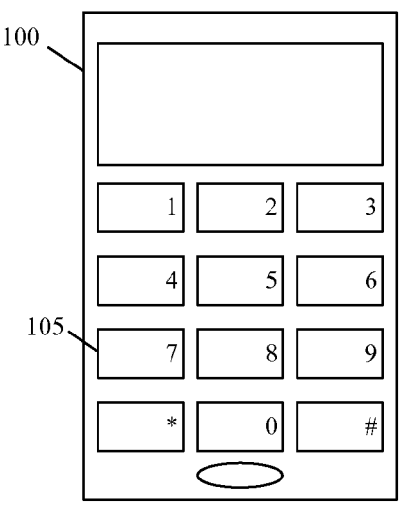
FIG. 4 depicts the mobile station of FIG. 1 in yet a different operating state.

FIG. 4 depicts the mobile station 100 of FIG. 1 in yet a different operating state. The operating state illustrated in FIG. 4 is one in which the keys are more likely to be used to input numbers, i.e. a telephone or dialing mode. In that case, the controller can deactivate the red light source and can energize a blue light source. The numeric symbols can be included in the blue light filter associated with each respective key. The blue light source emits light having a wavelength within a specified pass band of the blue light filter. Accordingly, only blue light from the blue light source is permitted to pass. As a result, the alphabetic symbols of the red light filter are no longer visible and the numeric symbols of the blue light filter become visible. For instance, key 105 now has a symbol, or legend, of "7". By changing the light source that is used for one or more keys, the legend upon the key can be made to change dynamically in a manner that corresponds to the particular function that is assigned to the key at any given time.

Figure 5:
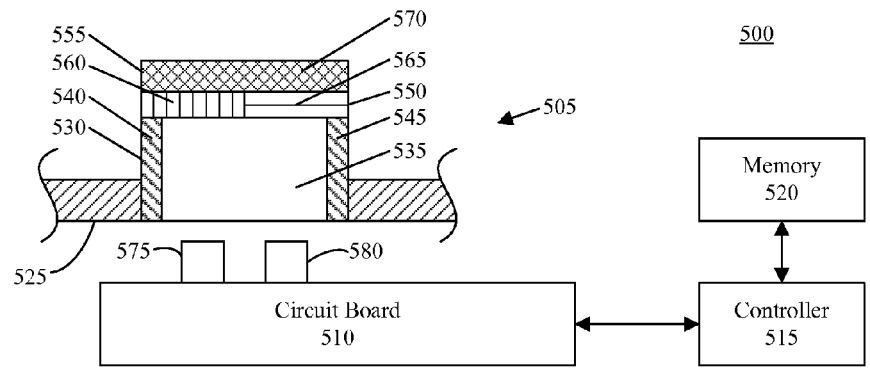
FIG. 5 depicts another section view of the mobile station of FIG. 1 taken along section line 2-2.

FIG. 5 depicts another section view of the mobile station of FIG. 1 taken along section line 2-2. FIG. 5 depicts the mobile station of FIG. 1 including a multi-function key system 500 configured in accordance with another arrangement of the present invention. As was the case with respect to FIG. 1, the multi-function key system 500 can include a keypad assembly 505, a circuit board 510, a controller 515, and a memory 520. The keypad assembly 505 can include a keypad base 525 and at least one key 530. The key 530 has a back portion 535, two side portions 540, 545, a top portion 550, and a front portion (not shown). The back portion 535, two side portions 540, 545, and front portion effectively join to form a perimeter wall that defines an internal cavity. The particular shape of key 530 is not intended to be a limitation of the present invention.

In one arrangement, the key 530 can be fabricated from a silicone-based material. The top portion 550 can be formed of two optical filter sections 560, 565, with each filter section 560, 565 being configured to filter a different wavelength, or wavelength range, of light. For example, filter section 560 can be a blue light filter which passes blue light within a defined wavelength range. Filter section 565 can be a red light filter that passes red light within a defined wavelength range. Though FIG. 5 shows only two different filter sections, i.e. filter sections 560, 565, the top portion 550 can include more than two filter sections if so desired along with additional matching light sources. It also should be appreciated that the particular filter colors noted herein are provided for purposes of illustration only and, as such, are not intended to limit the present invention.

Each of filter sections 560, 565 can include a symbol. The symbols can be placed onto filter sections 560, 565 through any of a variety of different processes including, but not limited to, engraving, printing, or cutting the silicone using a laser. Such processes render the symbol portion of each of filter sections 560, 565 opaque. Thus, filter section 560, in reference to the blue light filter, can pass blue light except for those portions of the filter section 560 where the symbol is located. Filter section 565, in reference to the red light filter, can pass red light except for those portions of filter section 565 where the symbol is located. The symbols, having been engraved, printed, etched, or any combination thereof, become opaque and do not pass light. The symbols may appear black, or as some other color depending upon whether printing, silk-screening, or another color application process has been used. In accordance with the multi-functional aspect of key 530, it should be appreciated that the symbol of section 560 can be different, or visually distinct, from the symbol of section 565.

Located on top of key 530 can be a protective layer 570. In one arrangement, the protective layer 570 can be a substantially translucent or transparent film as described herein. In another arrangement, the protective layer 570 can be opaque or semi-opaque such that the symbols disposed on sections 560, 565 can be hidden from view unless the light source corresponding to one or both of the sections 560, 565 is illuminated. In any case, the protective layer 570 can be optically coupled to the key 530.

The circuit board 510 can be disposed below the keypad assembly 505 and can include at least two light sources 575, 580. The color of each light source 575, 580 can correspond, or be matched, to the color of each of filter sections 560, 565. For example, if filter section 560 is a blue light filter, light source 575 can emit light having a wavelength within the pass band of filter section 560. If section 565 is a red light filter, light source 580 can emit light having a wavelength that is within the pass band of filter section 565.

Accordingly, when light source 575 is illuminated, light from light source 575 can pass through filter section 560. Filter section 560 can appear blue in color. The symbol of section 560, however, does not pass light. In consequence, the symbol of section 560 will appear black or another color. The symbol becomes increasingly visible against the blue illuminated filter section 560. If light source 580 is illuminated, light from light source 580 can pass through filter section 565. Filter section 565 can appear red in color. The symbol of filter section 565 does not pass light and appears black or some other color against the red illuminated filter section 565.

It should be appreciated that when the light source 575, i.e. the blue light source, is illuminated, blue light does not pass through filter section 565 due to the filter properties of filter section 565. When light the source 580, i.e. the red light source, is illuminated, red light does not pass through filter section 560 due to the filter properties of section 560. Thus, only one filter section, either filter section 560 or 565, becomes illuminated when the light source matched to the filter properties of that section is energized. The symbol of the illuminated section becomes increasingly visible as that symbol will be viewed against an illuminated background, whereas the other symbol has no illuminated background.

The activation and deactivation of light sources 575, 580 can be controlled via the controller as discussed with reference to FIG. 1. Accordingly, any of a variety of different events or circumstances occurring within or detected by a mobile station can be used to trigger the illumination and/or deactivation of one of more of the light sources 575, 580.

Figure 6:
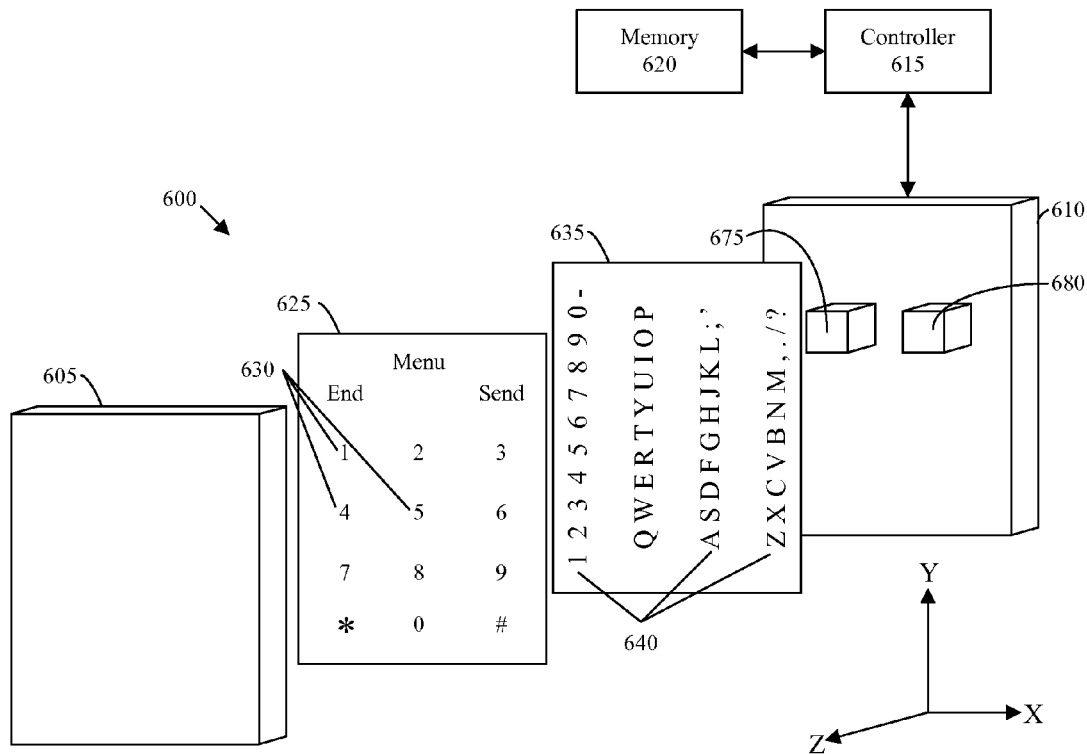
FIG. 6 depicts an exploded view of another multi-function key system that is useful for understanding the present invention.

FIG. 6 depicts an exploded view of another multi-function key system 600 that is useful for understanding the present invention. In this arrangement, the keypad assembly 605, circuit board 610, controller 615, and memory 620 can be substantially similar to the corresponding components described with reference to FIG. 1. Accordingly, circuit board 610 can have at least two light sources 675, 680, each of different colors, which can be selectively illuminated under the control of controller 615. In this arrangement, keypad assembly 605 can be a silicone keypad that is substantially transparent or translucent, as the case may be, such that the keypad assembly 605 can be backlit using light sources 675, 680 as shown.

The multi-function key system 600 shown in FIG. 6 also can include two films 625, 635. Each of films 625, 635 can be substantially transparent or translucent so as to allow visible light to pass unaffected, or unfiltered. As such, films 625, 635 and the keypad assembly 605 can be said to be optically coupled. Each film 625, 635 can have one or more symbols 630, 640 placed thereon in a selected color. The color of symbols 630 on film 625 can be different from the color of symbols 640 on film 635. The colors used for the symbols on each of films 625, 635 can correspond to the colors of the light sources 675, 680. For instance, the coloring of the symbols 630 on film 625 can be the same as, or substantially similar to, the color of light emitted from light source 675. Similarly, the coloring of the symbols 640 on film 635 can be the same as, or substantially similar to, the color of light emitted from light source 680.

Accordingly, when light source 675 is illuminated under the control of controller 615 and light source 680 switched off, the light emitted matches the color of the symbols 630 on film 625. This causes symbols 630 to blend with the backlighting and fade from view, or become less visible. Symbols 630 become nearly imperceptible, or visually indistinguishable from the backlighting. The symbols 640 on film 635, however, are rendered visible in that the color of symbols 640 contrasts with the light emitted from light source 675.

Similarly, when light source 680 is illuminated and light source 675 is switched off, the light emitted matches the color of the symbols 640 on film 635. The symbols 640 blend with the color of the backlighting rendering the symbols 640 less visible. Accordingly, symbols 640 become nearly imperceptible or visually indistinguishable from the backlighting. Symbols 630 of film 625 become visible. The result is that either the symbols 630 of film 625 or the symbols 640 of film 635 are visible at any given time.

Films 625, 635 can be layered upon one another, or stacked. The films 625, 630 can be layered beneath the keypad assembly 605, above the keypad assembly 605, or one above and the other below the keypad assembly 605. It should be appreciated that each of symbols 630 and 640 can be aligned to be located over a key of keypad assembly 605. The directional axis illustrates how film 625, 630 and the circuit board 610 can be aligned, or substantially aligned, along a common axis, in this case the Z-axis, such that each is approximately parallel to one another and circuit board 610. Further, films 625, 630 would approximately parallel to the keypad assembly 605.

The arrangements illustrated with reference to FIGS. 2, 5, and 6 can display one or more of a plurality of images or symbols for a single key. The arrangements of FIGS. 2 and 5 present images for a single key that are offset from one another. For example, if viewed simultaneously, the red and blue symbols would be located next to one another rather than occupying a same location. Such is the case as the two different light filters are effectively side by side. By comparison, the arrangements illustrated with reference to FIG. 6 can display the images in the same location. That is, if both images, red and blue, were simultaneously presented, one can be superimposed over the other.

Figure 7:
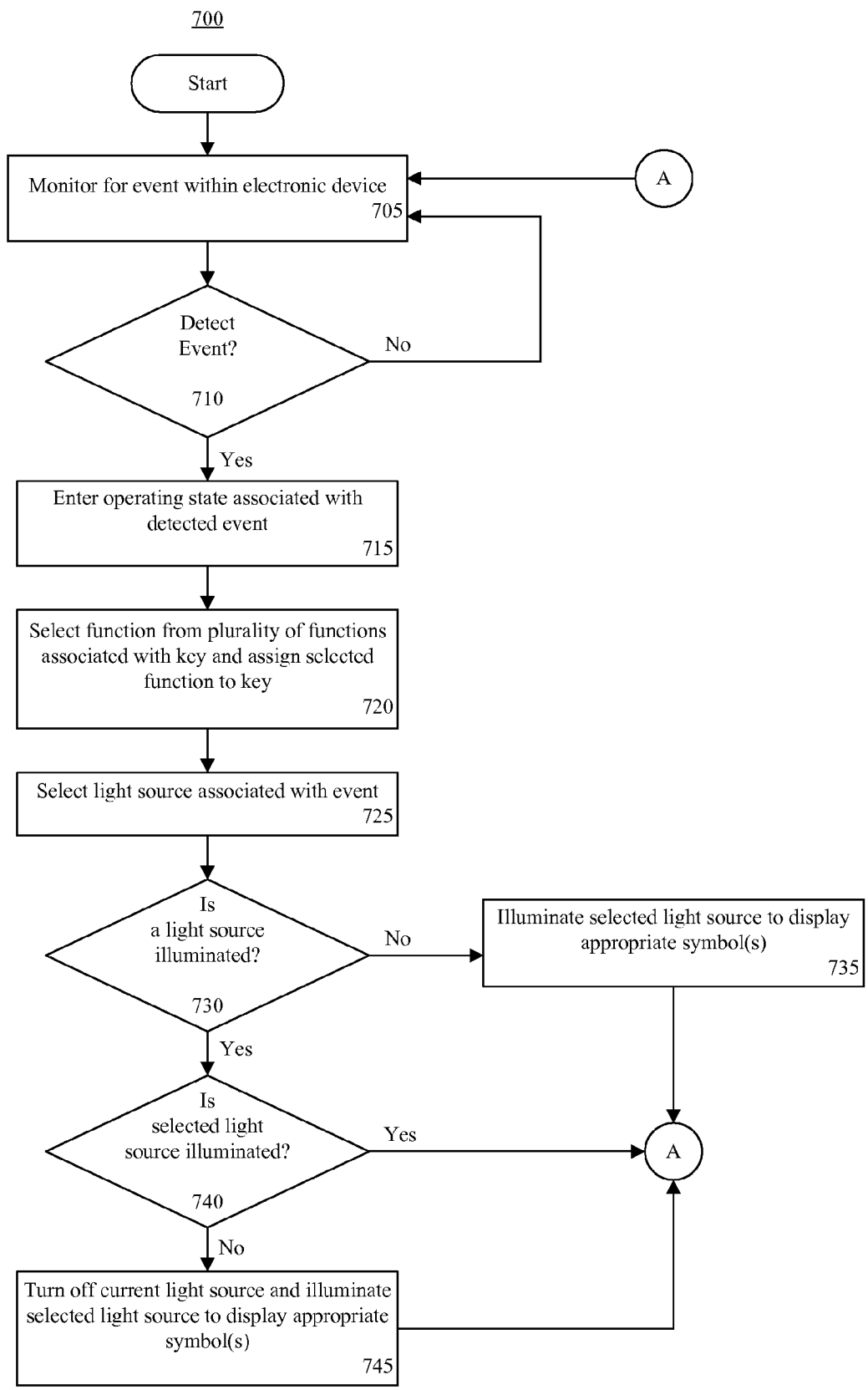
FIG. 7 depicts a flowchart of a method of dynamically changing symbols for a key that is useful for understanding the present invention.

FIG. 7 depicts a flowchart of a method 700 of dynamically changing symbols for a key that is useful for understanding the present invention. The method 700 can begin in a state in which an electronic device, such as a mobile station, is powered on and is functioning in a particular operating state. Responsive to different stimuli within the electronic device, one or more of the keys of the device can take on a different functionality. Accordingly, the symbol displayed for such a key also can be changed according to the functionality assigned to that key at any given time.

Thus, in step 705 the controller can begin to monitor for the occurrence of a particular event within the electronic device. As noted, an event can include, but is not limited to, receiving a message, whether voice, text, etc., receiving a user input, or any other occurrence which may cause a state change in an electronic device. In step 710, a determination can be made as to whether an event has been detected. If so, the method can continue to step 715. If not, however, the method can loop back to step 705 to continue monitoring for an event.

Continuing with step 715, the electronic device can enter an operating state corresponding to, or indicated by, the detected event. In step 720, from a plurality of functions that can be assigned to a particular key, a function that is associated with the operating state entered in step 715 can be selected. The selected function can be assigned to the key.

In step 725, a light source associated with the detected event, and thus the current operating state, can be identified. In the arrangement where two or more different colored light filters are provided, with each filter including a different symbol, the light source having the same color as the symbol to be displayed can be identified. Thus, if the function assigned to the key necessitates a numeric symbol be displayed upon the key rather than an alphabetic symbol, the light source of the same color as the filter including the numeric symbol can be selected for illumination.

In the arrangement where two transparent films or multi-colored silicone keys are provided, the light source corresponding to the symbol(s) that are not to be displayed can be identified. Taking the prior example, if the function assigned to the key necessitates a numeric symbol to be displayed upon the key rather than an alphabetic symbol, the light source of the same color as the alphabetic symbol(s) can be selected for illumination. When energized, the alphabetic symbol(s) fade from view, blending with the backlighting, thereby causing the numeric symbol(s) to stand out against the backlighting.

In step 730, a determination can be made as to whether a light source is already illuminated. If not, the selected light source can be illuminated in step 735 to display the appropriate symbol(s). If a light source is already illuminated, the method can proceed to step 740, where a determination can be made as to whether the selected light source is illuminated. If so, the selected light source can remain illuminated and the method can continue to step 705 to continue monitoring for events. If the selected light source is not illuminated, the light source that is currently illuminated can be switched off and the selected light source can be illuminated to cause the appropriate symbol(s) to be displayed.

The arrangements disclosed herein can dynamically change the symbol or legend that is displayed upon, or within, a key or keypad of an electronic device such as a mobile station. Based upon the particular function that is currently assigned to a multi-function key, a symbol corresponding to that function can be selectively displayed. The symbol is illuminated using one of a plurality of differently colored light sources that works cooperatively with an optical film upon which the symbol(s) to be displayed are located.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A multi-function key system for use with an electronic device comprising:
   at least one key;
   an optical film optically coupled to the key, said optical film comprising a first optical filter corresponding to a first color of light and a second optical filter corresponding to a second color of light;
   a first light source, disposed below the key, that emits the first color of light;
   a second light source, disposed below the key, that emits the second color of light; and
   a controller that selectively activates the first light source or the second light source responsive to an event detected within the electronic device.

2. The multi-function key system of claim 1, wherein the first optical filter has at least a first symbol, such that light from the first light source renders the first symbol visible.

3. The multi-function key system of claim 1, wherein the second optical filter has at least a second symbol, such that light from the second light source renders the second symbol visible.

4. The multi-function key system of claim 1, wherein the first optical filter has at least a first symbol and the second optical filter has at least a second symbol, wherein the first symbol or the second symbol is visible according to which light source is illuminated.

5. The multi-function key system of claim 4, wherein the first symbol and the second symbol are not concurrently visible.

6. The multi-function key system of claim 1, further comprising a substantially transparent protective layer disposed over the key.

7. The multi-function key system of claim 1, further comprising a semi-opaque protective layer that obscures the first symbol and the second symbol from view when no light source is illuminated.

8. A multi-function key system for use with an electronic device comprising:
- at least one key;
- a first optical film having at least a first symbol in a first color, wherein the first optical film is otherwise transparent and is optically coupled to the key;
- a second optical film having at least a second symbol in a second color, wherein the second optical film is otherwise transparent and is optically coupled to the key;
- a first light source, disposed below the key, that emits light in the first color;
- a second light source, disposed below the key, that emits light in the second color; and
- a controller that selectively activates the first light source or the second light source responsive to an event detected within the electronic device.

9. The multi-function key system of claim 8, wherein when the first light source is illuminated, the second symbol is visible.

10. The multi-function key system of claim 8, wherein when the second light source is illuminated, the first symbol is visible.

11. The multi-function key system of claim 8, wherein the first symbol or the second symbol is visible according to the light source that is illuminated.

12. The multi-function key system of claim 8, wherein the first symbol and the second symbol are not concurrently visible when one of the light sources is illuminated.

13. A multi-function key system for use with an electronic device comprising:
- at least one key comprising a first optical filter corresponding to a first color of light and a second optical filter corresponding to a second color of light;
- a first light source, disposed below the key, that emits light of the first color;
- a second light source, disposed below the key, that emits light of the second color; and
- a controller that selectively activates the first light source or the second light source responsive to an event detected within the electronic device thereby illuminating the first optical filter or the second optical filter.

14. The multi-function key system of claim 13, wherein the first optical filter has at least a first opaque symbol.

15. The multi-function key system of claim 13, wherein the second optical filter has at least a second opaque symbol.

16. The multi-function key system of claim 13, wherein the first symbol or the second symbol is highlighted by an illuminated background according to the light source that is illuminated.

17. The multi-function key system of claim 16, wherein the first symbol and the second symbol are not concurrently viewed against an illuminated background when one of the light sources is illuminated.

18. The multi-function key system of claim 13, wherein the first optical filter has at least first opaque symbol and the second optical filter has at least a second opaque symbol, wherein the first opaque symbol or the second opaque symbol becomes visible against an illuminated background according to the detected event.

19. The multi-function key system of claim 13, further comprising a substantially transparent protective layer disposed over the key.

20. The multi-function key system of claim 13, further comprising a semi-opaque protective layer that obscures the first symbol and the second symbol from view when no light source is illuminated.

* * * * *